V. A. BOKER.
DRAFT CONNECTION.
APPLICATION FILED AUG. 27, 1917.
1,317,907.
Patented Oct. 7, 1919.
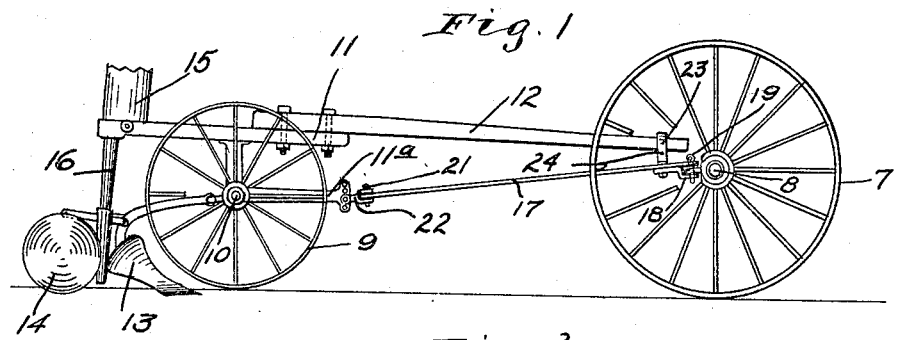
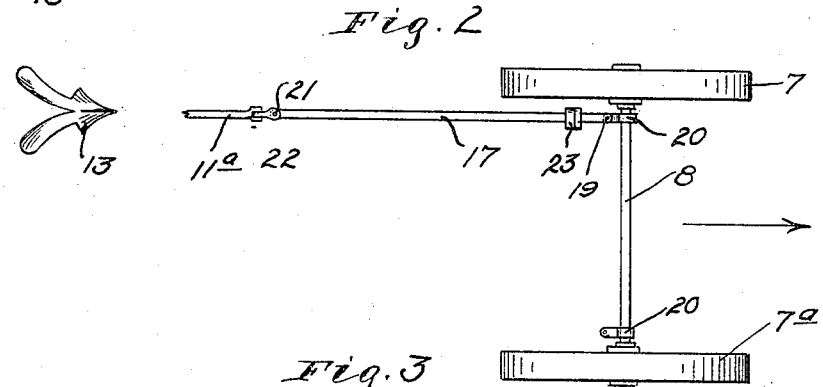
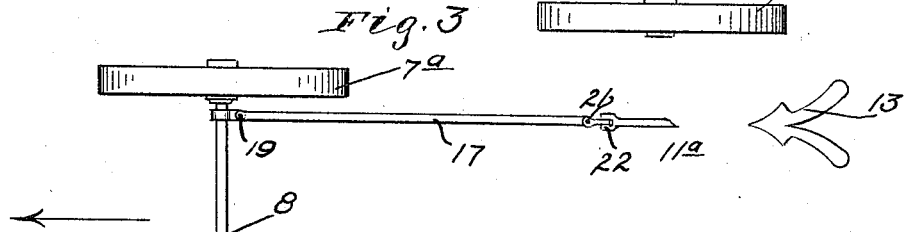
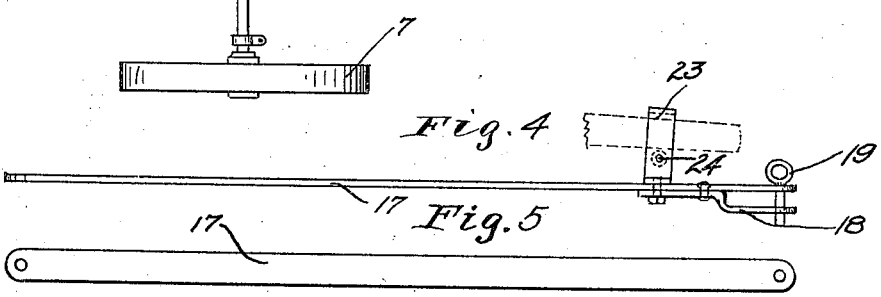
Witnesses
A. H. Opsahl
G. F. Williamson
Inventor
V. A. Boker.
By his Attorneys
Williamson Merchant

UNITED STATES PATENT OFFICE.

VITUS A. BOKER, OF MINNEAPOLIS, MINNESOTA.

DRAFT CONNECTION.

1,317,907. Specification of Letters Patent. Patented Oct. 7, 1919.

Application filed August 27, 1917. Serial No. 188,286.

*To all whom it may concern:*

Be it known that I, VITUS A. BOKER, a citizen of the United States, residing at Minneapolis, in the county of Hennepin and State of Minnesota, have invented certain new and useful Improvements in Draft Connections; and I do hereby declare the following to be a full, clear, and exact description of the invention, such as will enable others skilled in the art to which it appertains to make and use the same.

My invention has for its object to provide an improved draft connection for properly drawing a corn planter, lister, cultivator, or other ground working implement, from a tractor or other vehicle; and to such ends, generally stated, the invention consists of the novel devices and combinations of devices hereinafter described and defined in the claim.

The invention is illustrated in the accompanying drawings wherein like characters indicate like parts throughout the several views. Referring to the drawings:

Figure 1 is a side elevation showing the improved draft device applied to connect a wheel-equipped planter to the rear axle of a tractor or other vehicle by means of which the planter is to be drawn;

Figs. 2 and 3 are fragmentary plan views showing in part a device, as shown in Fig. 1;

Fig. 4 is a side elevation of the draft device removed from working position;

Fig. 5 is a plan view of the same; and

Fig. 6 is a front end elevation of the said draft device.

Of the parts of the tractor as they are shown, the numeral 7 indicates the rear or traction wheel and the numeral 8 the rear axle which latter is assumed to be nonrotary, as is usually the case.

Of the parts of the wheel-equipped planter, the numeral 9 indicates the wheels mounted on the axle 10; and the numeral 11$^a$ the draw bar secured to said axle 10; the numeral 11 the framework having a forwardly projected rigidly connected pole 12; the numeral 13 the furrow forming plow, the numeral 14 the furrow closing disks; and the numeral 15 the seed box having the seed delivery spout 16, all of which parts are, or may be of the usual well known construction.

My improved draft device comprises a reach bar 17, preferably formed from a flat steel bar and provided at its front end with a pronged head 18, which, by means of a coupling pin 19, is adapted to be detachably pivoted, at will, to the perforated lugs of either of two sleeve-like coupling heads 20 secured to the rear axle 8, one near to each of the wheels 7—7$^a$. The perforated rear end of the reach bar 17 is, as shown, detachably pivoted, by a pin 21 to a clevis or coupling head 22, which latter, as shown, is adjustably pivoted to the head of the drawbar 11$^a$.

The front end of the pole 12 is passed through a retaining loop 23 preferably, and as shown, a rectangular metal structure having a transverse bolt 24 upon which the said pole rests. This loop 23 has a perforated lower portion formed with perforated lateral projections 25 which adapt it to be attached to the front portion of the reach 17, for various lateral adjustments in respect thereto, by means of a small nut-equipped bolt or pin 26 best shown in Fig. 6.

When the planter is attached to the tractor, as illustrated, it will be drawn therefrom and joined to properly follow the same. Obviously, the reach 17 produces the pulling action and the loop or retainer on the front portion of the said reach guides the pole 12 and properly steers the planter.

Very frequently, the planting action will be produced by a back and forth travel across the field and this will require the drawbar to be shifted from the one side to the other of the tractor. For example, when traveling in the direction of the arrow marked on Fig. 2, the reach bar will be attached to that coupling head 20 that is adjacent to the wheel 7, and, when traveling back, or in the reverse direction indicated by the arrow marked on Fig. 3, the said reach will be shifted and coupled to that coupling head 20 that is adjacent to the wheel 7$^a$. This shifting is produced simply by the removal and reapplication of the one pin 19, for the reason that the pole is, by the retainer or guide loop 23, caused to follow the reach bar. This makes the reapplication of the reach, as above described, an easy operation, capable of being quickly performed.

What I claim is:

The combination with a vehicle and a reach pivotally connected at its front end to the rear portion of said vehicle, of a wheel-equipped rear implement having a forwardly projecting steering pole, the rear end of said reach being pivotally connected to said rear vehicle and serving to draw the same forward, said reach, at its front portion, having a keeper engaging the front end of said pole and guiding the same laterally to produce the steering action but permitting said pole to move forwardly and rearwardly, in respect to said reach, the pivotal connection between said reach and the rear portion of said front vehicle being shiftable from one side to the other to adapt the rear implement for operation under both directions of travel.

In testimony whereof I affix my signature in presence of two witnesses.

VITUS A. BOKER.

Witnesses:
CLARA DEMAREST,
F. D. MERCHANT.

Copies of this patent may be obtained for five cents each, by addressing the "Commissioner of Patents, Washington, D. C."